US010959295B2

(12) United States Patent
Dong et al.

(10) Patent No.: US 10,959,295 B2
(45) Date of Patent: Mar. 23, 2021

(54) SHIELDED WIRE FOR HIGH VOLTAGE SKIN EFFECT TRACE HEATING

(71) Applicant: nVent Services GmbH, Schaffhausen (CH)

(72) Inventors: Wesley Dong, Belmont, CA (US); Paul Becker, San Carlos, CA (US)

(73) Assignee: nVent Services GmbH, Schaffhausen (CH)

( * ) Notice: Subject to any disclaimer, the term of this patent is extended or adjusted under 35 U.S.C. 154(b) by 573 days.

(21) Appl. No.: 15/591,949

(22) Filed: May 10, 2017

(65) Prior Publication Data

US 2017/0332444 A1 Nov. 16, 2017

Related U.S. Application Data

(60) Provisional application No. 62/334,346, filed on May 10, 2016.

(51) Int. Cl.
*H05B 3/56* (2006.01)
*H05B 3/00* (2006.01)
(Continued)

(52) U.S. Cl.
CPC ............... *H05B 3/56* (2013.01); *H01B 7/02* (2013.01); *H01B 7/17* (2013.01); *H05B 3/0004* (2013.01);
(Continued)

(58) Field of Classification Search
CPC ...... H05B 3/56; H05B 3/00; H05B 2203/021; H05B 3/36; H05B 2214/02; H05B 3/0004;
(Continued)

(56) References Cited

U.S. PATENT DOCUMENTS 3,433,891 A 3/1969 Zysk
3,643,004 A * 2/1972 McKean ............... H01B 9/027
174/36
(Continued)

FOREIGN PATENT DOCUMENTS

| CN | 1571075 A | 1/2005 |
| DE | 102008021204 A1 | 11/2009 |
| JP | 2002109970 A | 4/2002 |

OTHER PUBLICATIONS

Wire and Cable Tips "When to Use Medium-Voltage Cables" (Year: 2014).*

*Primary Examiner* — Tu B Hoang
*Assistant Examiner* — Bonita Khlok
(74) *Attorney, Agent, or Firm* — Quarles & Brady LLP

(57) ABSTRACT

A skin effect heating system for long pipelines includes a heater cable disposed in a ferromagnetic or other conductive heat tube, the heater cable and heat tube cooperating to produce heat that is applied to the carrier pipe. The heater cable includes a conductor surrounded by an insulating layer, and then a semiconductive outer layer or "jacket." The semiconductive jacket contacts the inner surface of the heat tube, where the charge density of the return current carried by the heat tube is at its highest. The semiconductive jacket material has a resistivity that is sufficiently low to reduce or eliminate arcing events such as corona discharge by allowing accumulated charge on the heat tube to dissipate. The resistivity is also high enough to prevent the return current from flowing into or through the semiconductive outer layer, so that heat production capacity of the system is maximized.

18 Claims, 4 Drawing Sheets

(51) Int. Cl.
*H01B 7/02* (2006.01)
*H01B 7/17* (2006.01)

(52) U.S. Cl.
CPC .... *H05B 2203/021* (2013.01); *H05B 2214/02* (2013.01); *H05B 2214/03* (2013.01)

(58) Field of Classification Search
CPC ........ H05B 2214/03; H05B 3/42; H05B 3/78; H01B 7/02; H01B 7/17; H01B 7/428; F16L 53/34; F16L 53/38
USPC ....... 392/469, 311, 465, 466, 468, 301, 302, 392/478–482, 485–490
See application file for complete search history.

(56) References Cited

U.S. PATENT DOCUMENTS

| | | |
|---|---|---|
| 3,718,804 A | 2/1973 | Ando |
| 3,748,369 A | 7/1973 | Durakis et al. |
| 3,769,085 A | 10/1973 | Matsubara |
| 3,793,716 A | 2/1974 | Smith |
| 3,878,319 A | 4/1975 | Wahl |
| 4,109,098 A | 8/1978 | Olsson et al. |
| 4,436,565 A | 3/1984 | Wietzel et al. |
| 4,532,375 A | 7/1985 | Weitzel et al. |
| 4,560,524 A | 12/1985 | Smuckler |
| 4,617,449 A * | 10/1986 | Weitzel ................ H05B 3/0004 174/88 R |
| 4,629,869 A | 12/1986 | Bronnvall |
| 4,687,882 A | 8/1987 | Stone et al. |
| 4,780,576 A | 10/1988 | Kuno |
| 5,206,485 A | 4/1993 | Srubas et al. |
| 5,300,733 A | 4/1994 | Uematsu |
| 8,559,800 B2 | 10/2013 | Ellis et al. |
| 8,696,939 B2 | 4/2014 | Negle |
| 8,939,207 B2 | 1/2015 | De St. Remey et al. |
| 2012/0037611 A1 | 2/2012 | Karlsen et al. |
| 2012/0205137 A1 | 8/2012 | Fjellner et al. |

\* cited by examiner

SHIELDED WIRE FOR HIGH VOLTAGE SKIN EFFECT TRACE HEATING

CROSS-REFERENCE TO RELATED APPLICATIONS

This application claims the benefit of priority from U.S. Prov. Pat. App. Ser. No. 62/334,346, filed under the same title on May 10, 2016, and incorporated fully herein by reference.

BACKGROUND OF THE INVENTION

The field of the invention is high voltage heater cables. More particularly, the invention relates to wire designs for skin effect heat tracing system components.

In the oil and gas industry, pipelines must be heated over distances of many miles. Skin effect electric heat tracing systems are ideally suited for long transfer pipelines up to 12 miles (20 km) per circuit. The system is engineered for the specific application. Applications for this system include material transfer lines, snow melting and de-icing, tank foundation heating, subsea transfer lines and prefabricated, pre-insulated lines. In a skin-effect heating system, heat is generated on the inner surface of a ferromagnetic heat tube that is thermally coupled to the pipe to be heat traced. An electrically insulated, temperature-resistant conductor is installed inside the heat tube and connected to the tube at the far end. An alternating current (AC) is passed through the insulated conductor and returns through the heat tube.

The ferromagnetic heat tube of a skin-effect heating system is prone to the corona effect as a charge difference builds up between the surface of the tube and the surface of the insulated conductor and exceeds the breakdown electric field for air ($3 \times 10^6$ V/m). This effect becomes a significant issue for longer pipelines that require a higher voltage potential to drive the current that also results in greater charge build up between the two surfaces. The accumulated static electricity can damage or prematurely age the insulation and other components, and at voltages over about 5 kV can discharge in arcing events.

In a traditional skin effect heating system, the core conductor of the heater cable sits inside an insulation layer. The heater cable is surrounded by air except at the point at which the insulating jacket contacts the inner surface of the heat tube. Partial discharge is caused by the charge differential between the surface of the insulation and the inner surface of the grounded heat tube, which carries the return AC in the opposite direction; the inner surface of the heat tube has the highest charge density, relative to the rest of the heat tube, due to the skin effect. Protracted partial discharge can erode solid insulation and eventually lead to breakdown of insulation at the point of contact. Protracted partial discharge also tends to initiate at defects (voids, imperfections, contaminants) in the heat tube. It can also cause a corona effect, a localized discharge resulting from transient gaseous ionization on an insulation system when the voltage stress exceeds a critical value; inception in air at room temperature occurs at or about $3 \times 10^6$ V/m.

It is desirable to heat pipelines on the order of 36 miles, and to handle voltages larger than 5 kV and up to 10 kV or even 20 kV in order to reach the desirable length. Thus it would be desirable to use a device to eliminate the risk of partial discharge.

SUMMARY OF THE INVENTION

The present invention overcomes the aforementioned drawbacks by providing a heater cable capable of withstanding a continuous applied voltage of at least 5 kV. The heater cable comprises a core conductor and an electrical insulation layer surrounding the core conductor. The heater cable further comprises an outer exposed semiconductive layer surrounding the electrical insulation layer. The semiconductive layer is in physical and electrical contact with an inner diameter of a ferromagnetic heat tube.

In one aspect, the present disclosure provides a skin effect heating system that includes a ferromagnetic heat tube that applies heat to a carrier pipe, and a heater cable disposed in an interior of the heat tube and cooperating with the heat tube to produce the heat and to complete an electrical circuit with a power source via skin effect. The heater cable includes a conductor, an inner semiconductive layer surrounding the conductor, an electrical insulation layer surrounding the inner semiconductive layer, and an outer semiconductive layer surrounding the electrical insulation layer and having an outer surface that contacts an inner surface of the heat tube.

The outer semiconductive layer has a resistivity whereby, when an alternating current is applied to the conductor at a voltage exceeding 5 kV: partial discharge occurring on the outer surface of the outer semiconductive layer does not exceed 20 nanocoulombs; and, no more than an insignificant portion of a return electric current, the return electric current flowing on the inner surface of the heat tube in opposite direction to the alternating current of the conductor, is diverted to the outer semiconductive layer, such that the loss by the heat tube of the insignificant portion does not affect heat output of the heat tube. The resistivity of the outer semiconductive layer can be between $10^{-1}$ and $10^5$ ohm-cm inclusive, or more particularly between 5 and 50 ohm-cm inclusive. The outer semiconductive layer can be an extruded layer that is extruded onto the electrical insulation layer. Or, the outer semiconductive layer can be a semiconductive tape wrapped around the electrical insulation layer.

In another aspect, the present disclosure provides a heater cable for a skin effect heating system. The heater cable includes a core conductor, an electrical insulation layer surrounding the core conductor, and an outer semiconductive layer surrounding the electrical insulation layer, the outer semiconductive layer contacting an inner surface of a ferromagnetic heat tube such that the heater cable forms an electrical circuit with the heat tube and a power source applying an alternating current to the core conductor, the electrical circuit causing skin effect heating of the heat tube. The outer semiconductive layer reduces partial discharge of the heater cable when the alternating current is applied continuously to the core conductor at a voltage exceeding 5 kV.

The outer semiconductive layer can have a resistivity that limits partial discharge at an outer surface of the outer semiconductive layer at or below 20 nanocoulombs; the outer semiconductive layer can further prevent flow of a substantial portion of an electric current flowing on the inner surface of the heat tube into the outer semiconductive layer. The outer semiconductive layer can reduce partial discharge of the heater cable when the alternating current is applied continuously to the core conductor at a voltage of 10 kV; the outer semiconductive layer can have a resistivity that limits partial discharge at an outer surface of the outer semiconductive layer to at most 10 nanocoulombs while the voltage is applied to the core conductor.

The outer semiconductive layer can have a resistivity between $10^{-1}$ and $10^5$ ohm-cm inclusive. The outer semiconductive layer can be affixed to the electrical insulation layer via an extrusion process, or the outer semiconductive layer can be a length of semiconductive tape wrapped around the electrical insulation layer. The heater cable can further include an inner semiconductive layer between the core conductor and the electrical insulation layer. The electrical insulation layer can be a first insulating material, and the outer semiconductive layer can be a combination or compound of of the first insulating material and a first conductive material.

The foregoing and other aspects and advantages of the invention will appear from, the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The following drawings are provided.

DETAILED DESCRIPTION OF THE INVENTION

Figure 1:
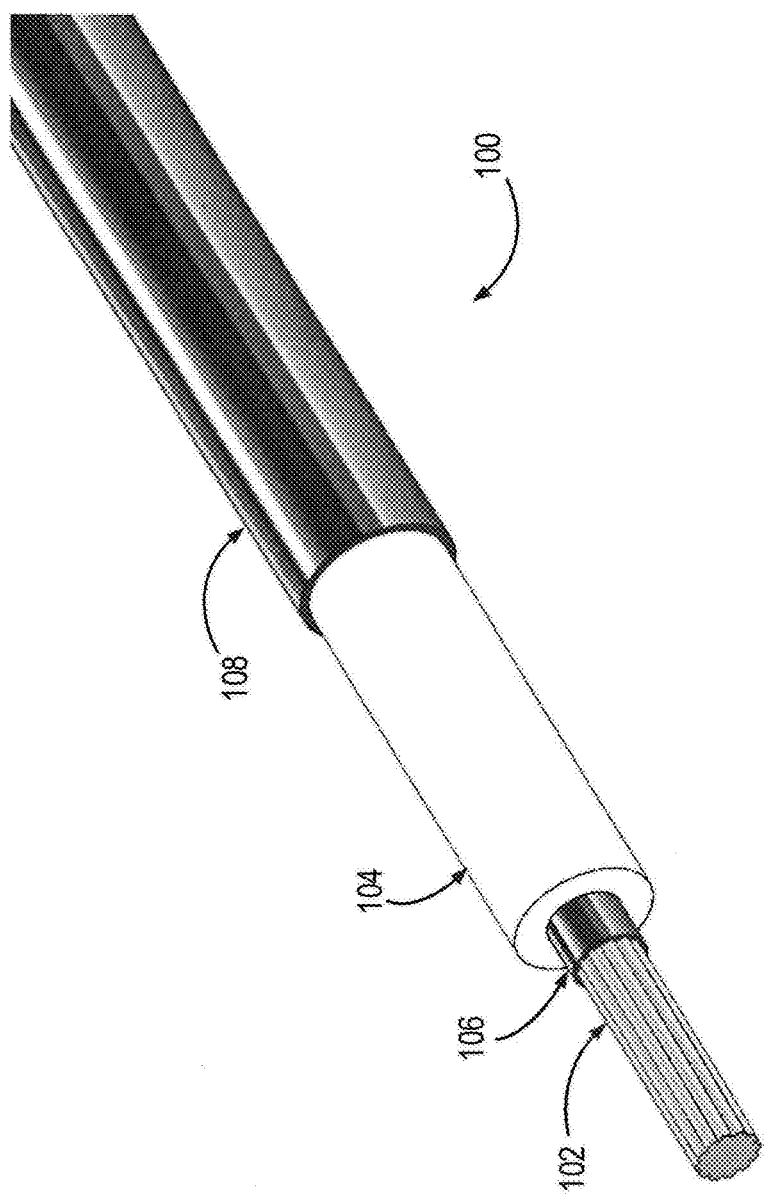
FIG. 1 is a perspective view of a heater cable in accordance with various embodiments of the present disclosure.

Referring now to the figures, FIG. 1 illustrates a heater cable 100 in accordance with various embodiments. The illustrated heater cable 100 is shown with each layer subsequently stripped to clearly illustrate its construction in accordance with at least one embodiment. The heater cable 100 includes a conductor 102 at its core. The conductor 102 can be of any suitable conductive material including tinned copper, nickel plated copper, aluminum, steel, gold, platinum, silver, and others. The conductor 102 may be a solid conductor wire or may be stranded wire. The conductor 102 is encapsulated within a non-conducting electrical insulation layer 104. The electrical insulation layer 104 may be of any suitable material including silicone, PFA, EDPM, XPLE, and others. In some embodiments, the circumference of the conductor 102 is entirely in physical contact with the electrical insulation layer 104. In other embodiments, the conductor 102 is encapsulated in or in direct electrical contact with an inner semiconductive layer 106. In these embodiments, the inner semiconductive layer 106 is encapsulated within the electrical insulation layer 104.

An outer semiconductive layer 108 surrounds the electrical insulation layer 104. The outer semiconductive layer 108 may be any suitable semiconductive material, combination of semiconductive materials, or semiconductive combination of electrically insulating material(s) with conductive material(s). In some embodiments, the outer semiconductive layer 108 can be the same base material as the insulation (e.g. silicone, PFA etc.) but can be mixed, doped, or otherwise loaded with carbon black or another conductive material to render the layer 108 semiconductive. In particular, and as further described herein, the composition of the outer semiconductive layer 108 can be selected so that the outer semiconductive layer 108, which contacts the inner surface of the heat tube being heated, reduces or eliminates corona partial discharge without interfering with the electrical relationship between the heater cable 100 and the heat tube that enables skin effect heating. Thus, the resistivity of the material comprising the outer semiconductive layer 108 may be low enough to reduce or eliminate corona at the outer surface of the heater cable 100. In particular, the resistivity may be low enough to prevent corona discharge even at locations along the length of the heater cable 100 where the heater cable 100 is not continuously in contact with the cooperating heat tube.

Furthermore, the resistivity of the outer semiconductive layer 108 may be high enough that the return alternating current, flowing along the inner surface of a cooperating heat tube (e.g., heat tube 200 of FIG. 2) in the opposite direction to alternating current in the conductor 102, does not flow substantially into the outer semiconductive layer 108. In particular, it is understood that the heat tube's transmission of the return skin effect current may contribute more than half (typically about 70%) of the thermal energy in the skin effect trace heating system (the heater cable contributes the remainder of the thermal energy); the outer semiconductive layer 108 may have a resistivity that only allows, at most, an insignificant portion of the return current to flow into or through the outer semiconductive layer 108, so that skin effect heating of the heat tube is not disrupted. For example, the outer semiconductive layer 108 may divert less than about 1% of the return current from the inner surface of the heat tube.

In various embodiments that minimize or eliminate both corona discharge and heat loss, the bulk resistivity of the outer semiconductive layer 108 can be between $10^{-1}$ and $10^6$ ohm-cm, or between $10^6$ and $10^2$ ohm-cm, or between 5 and 50 ohm-cm, inclusive. The bulk resistivity could possibly be $10^9$ or higher in some embodiments while remaining beneficial. In some embodiments, the outer semiconductive layer 108 may be applied to the insulation layer 104 by a standard extrusion and/or co-extrusion process, and may have a minimum thickness of about 0.5 mm. In other embodiments, the outer semiconductive layer 108 may be applied by other methods, such as wrapping a length of semiconductive tape around the insulation layer 104 to form the outer semiconductive layer 108. A suitable semiconductive tape may have a minimum thickness of about 0.1 mm. In any application method, the maximum suitable thickness of the outer semiconductive layer 108 is limited by cost considerations, availability of material, ease of application, and damage resistance (i.e., from being pulled through the heat tube during installation). With respect to practical considerations such as overall heater cable 100 diameter and relative diameter to the inner diameter of the heat tube in which the heater cable 100 is installed, the outer semiconductive layer thickness may have an upper limit of between 5 mm and 10 mm, inclusive.

Figures 2A, 2B:
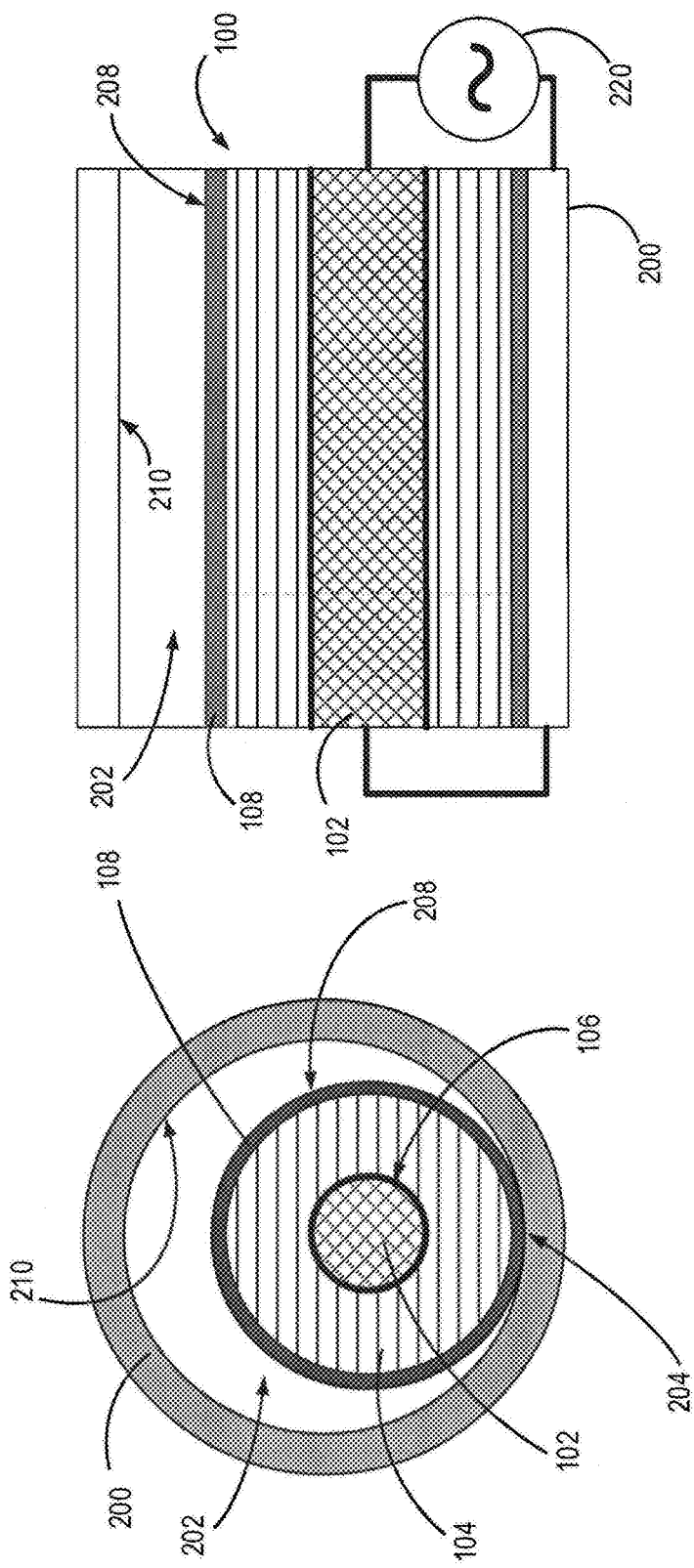
FIG. 2A is a cross-sectional front view and FIG. 2B is a cross-sectional side view illustrating positioning of the heater cable of FIG. 1 within a heat tube in accordance with various embodiments of the present disclosure.

Turning now to FIGS. 2A-B, front and side cross-sectional views of the heater cable 100 installed in a heat tube 200 in accordance with various embodiments are illustrated. The core conductor 102 of the heater cable can be surrounded by an inner semiconductive layer 106, though in some embodiments the inner semiconductive layer 106 can be omitted. The insulation layer 104 then surrounds the conductor and the inner semiconductive layer 106. An outer semiconductive layer 108 surrounds the insulation layer 104. The heater cable 100 can be disposed in the interior of a heat tube 200 (not shown to scale). The heater cable 100 can be surrounded by air in the interior 202 of the heat tube 200, except at a point 204 or portion at which the outer surface 208 of the outer semiconductive layer 108 lies in contact with an inner surface 210 of the heat tube 200. When the conductor 102 and the heat tube 200 are connected to an alternating current (AC) power source 220 to form an electric circuit as described herein (i.e., with the conductor 102 connected to "hot" and the heat tube 200 connected to "neutral"), electric charge, which in the absence of the outer semiconductive layer 108 accumulates on the surface of the insulation 104 and discharges as corona (partial discharge), can now be dissipated without corona through the semiconductive layer 108 which sits in physical and electrical contact with the inner surface 210 of the heat tube 200, effectively reducing or eliminating corona and its ill effects.

Figure 3:
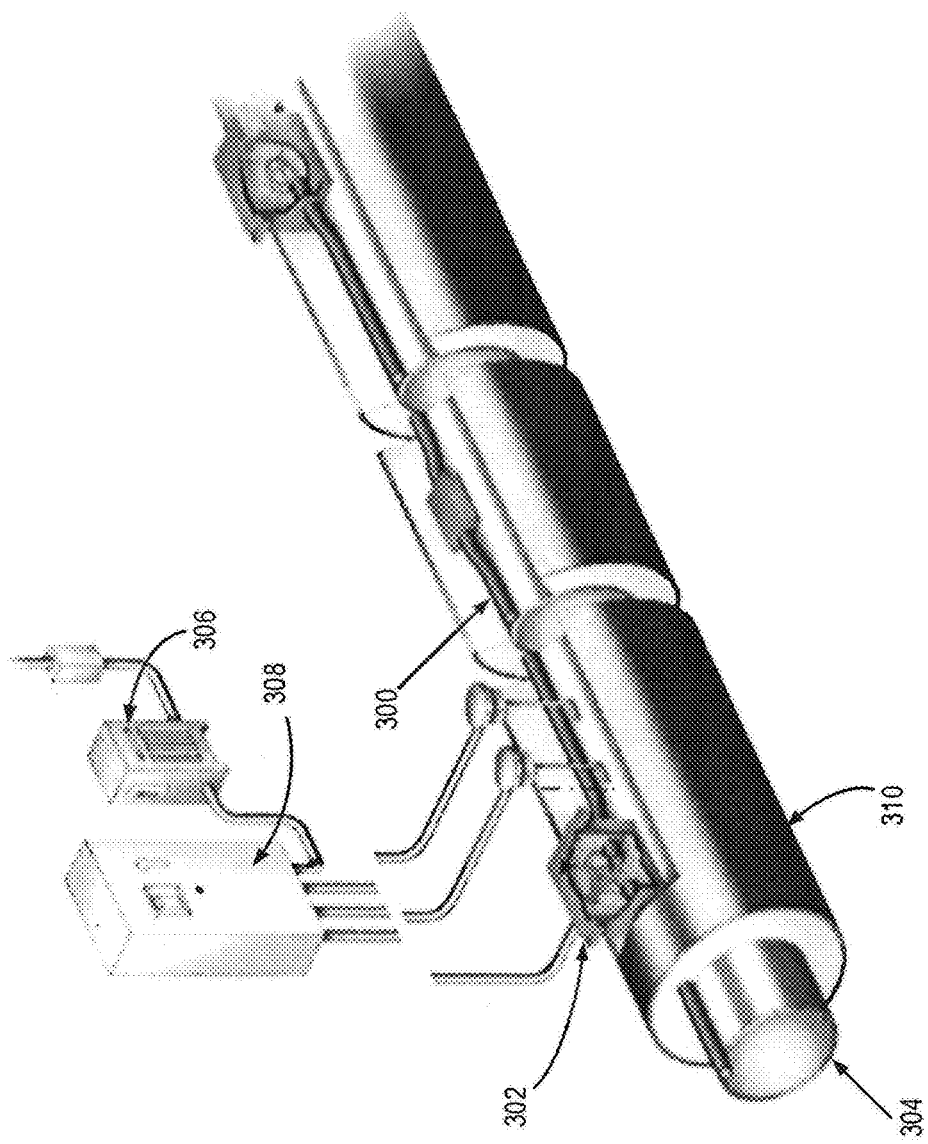
FIG. 3 illustrates the heater cable in accordance with various embodiments of the present disclosure shown positioned in a heat tube and positioned on a carrier tube as part of a skin effect heat tracing system.

The shielding of the heater cable 100 in this manner improves the application of the heater cable 100 to skin effect heating in pipeline systems at voltages above 5000 volts, where the return alternating current is carried by the heat tube 200 and is concentrated (i.e., has the highest charge density) within a "skin depth" measured into the heat tube 200 from the inner surface 210. The skin depth is inversely proportional to the square root of the magnetic permeability of the heat tube 200. In a typical skin-effect heating arrangement, as shown in FIG. 3, a ferromagnetic heat tube 300, which may be the heat tube 200 of FIG. 2, is placed against a carrier pipe 304 used for transporting oil, gas, or other heavy fluids. The semiconductive shielded heater cable of the present disclosure lies inside the heat tube 300. Thermal insulation 310 is disposed around the carrier pipe 304 and the heat tube 300 to retain heat. A transformer 306 and control box 308 are in electrical communication with the heat tube 300 at electrical connection boxes 302. These connection boxes 302 allow individual sections or circuits of the heater cable and/or heat tube 300 to be modified, replaced, or serviced without disturbing the insulation 310. Circuit lengths are determined by a combination of cable size, cable voltage, temperature rating, heat tube size, and attachment method. It is currently feasible to heat up to 25 Kilometers (15 miles) from a single source using supply voltages approaching 5,000 volts. This circuit length is partially limited by the risk of arcing events. Since charge accumulation is eliminated or mitigated using the present skin effect heating system, higher voltages can be applied to the heater cable. Consequently, the heat tube 300 may be deployed with longer distances between line lead connections 302.

Figure 4:
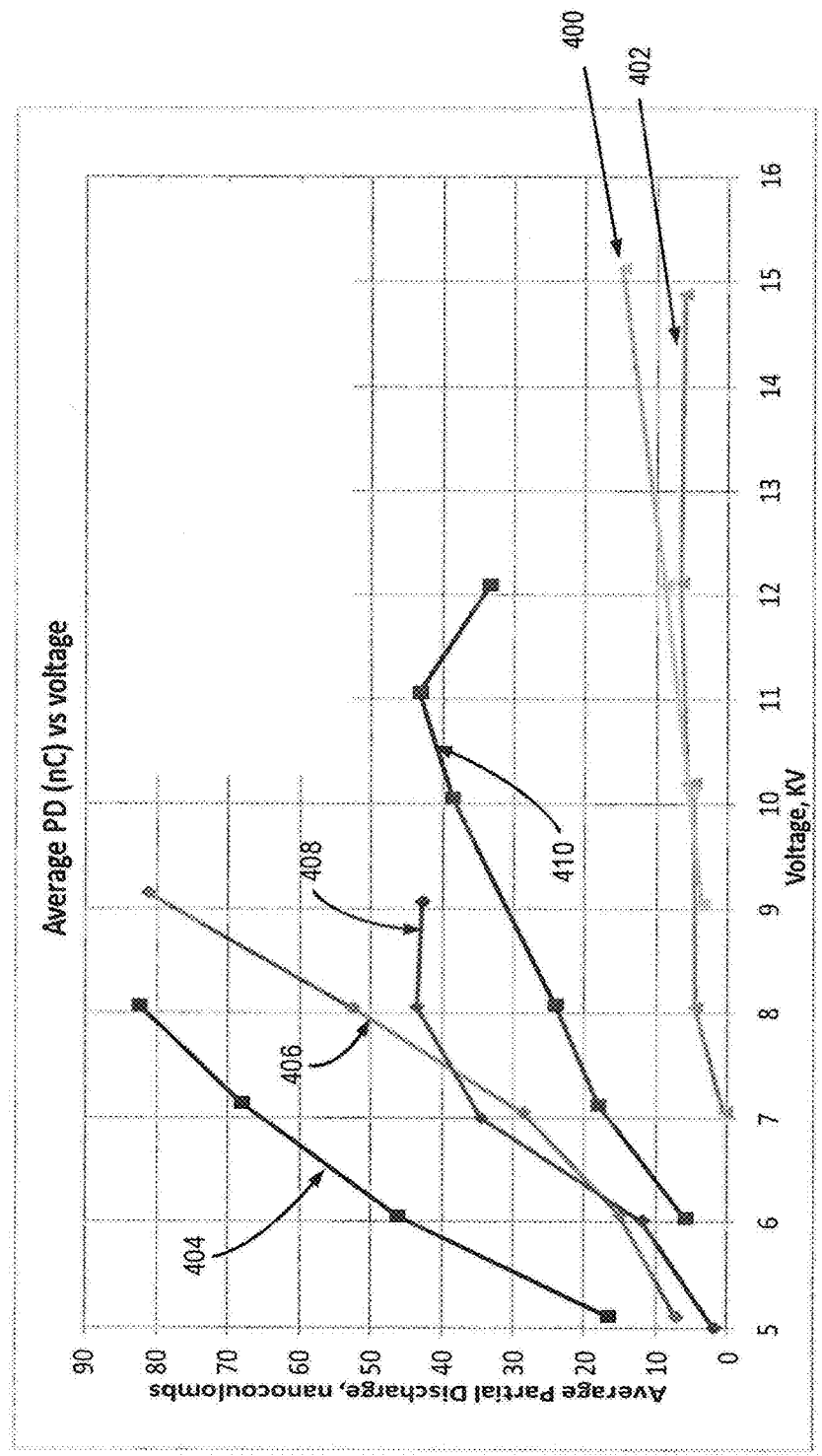
FIG. 4 is a plot of electric partial discharge vs. operating voltage for various embodiments of a heater cable in accordance with the present disclosure.

Turning now to FIG. 4, experiments were performed to verify the improved performance of semiconductive jacketed heater cables inside a heat tube according to the present disclosure over that of traditional heater cables, without a shielding semiconductive layer, as used in the art. On the y-axis, the measure of average partial discharge in nanocoulombs is plotted against the operating voltage of the heater cable relative to the heat tube. Plots 404, 406, 408, 410 show that heat tubes with traditional unshielded heater cables for skin effect heating of the heat tube experience extremely high levels of partial discharge. Thus, they are traditionally limited to operating voltages of 5 kV or less. The heater cables which use a semiconductive shielding layer according to various embodiments of the present disclosure are plotted in plots 400, 402; in particular plot 400 shows the average partial discharge inside the heat tube using the heater cable of plot 408 modified to include the present outer semiconductive layer. It can be seen that even at extremely high voltages, these heater cables do not experience a partial discharge above 20 nanocoulombs, and could even operate at 10 kV without a partial discharge above 10 nanocoulombs. Additional testing of disclosed embodiments of the invention has shown a partial discharge of only 50-200 picocoulombs at up to 14 kV.

The present invention has been described in terms of one or more preferred embodiments, and it should be appreciated that many equivalents, alternatives, variations, and modifications, aside from those expressly stated, are possible and within the scope of the invention.

The invention claimed is:
1. A skin effect heating system comprising:
a ferromagnetic heat tube configured to apply heat to a carrier pipe; and
a heater cable disposed in an interior of the ferromagnetic heat tube and cooperating with the ferromagnetic heat tube to produce the heat and to complete an electrical circuit with a power source via skin effect, the heater cable comprising:
a conductor;
an inner semiconductive layer surrounding the conductor;
an electrical insulation layer surrounding the inner semiconductive layer; and
an outer semiconductive layer surrounding the electrical insulation layer and having an outer surface in electrical and direct physical contact with an inner surface of the ferromagnetic heat tube, the outer semiconductive layer having a resistivity whereby, when an alternating current is applied to the conductor at a voltage exceeding 5 kV:
partial discharge occurring on the outer surface of the outer semiconductive layer does not exceed 20 nanocoulombs; and
no more than one percent of a return electric current flowing along the inner surface of the ferromagnetic heat tube in opposite direction to the alternating current of the conductor flows through the outer semiconductive layer.

2. The skin effect heating system of claim 1, wherein the resistivity of the outer semiconductive layer is between $10^{-1}$ and $10^{-5}$ ohm-cm inclusive.

3. The skin effect heating system of claim 1, wherein the resistivity of the outer semiconductive layer is between 5 and 50 ohm-cm inclusive.

4. The skin effect heating system of claim 1, wherein the outer semiconductive layer comprises an extruded layer that is extruded onto the electrical insulation layer.

5. The skin effect heating system of claim 1 wherein the outer semiconductive layer comprises a semiconductive tape wrapped around the electrical insulation layer.

6. A heater cable comprising:
a core conductor;
an electrical insulation layer surrounding the core conductor; and
an outer semiconductive layer surrounding the electrical insulation layer, the outer semiconductive layer in electrical and direct physical contact with an inner surface of a ferromagnetic heat tube such that the heater cable forms an electrical circuit with the ferromagnetic heat tube and a power source applying an alternating current to the core conductor, the electrical circuit causing skin effect heating of the ferromagnetic heat tube.

7. The heater cable of claim 6, wherein the outer semiconductive layer reduces partial discharge of the heater cable when the alternating current is applied continuously to the core conductor at a voltage exceeding 5 kV.

8. The heater cable of claim 7, wherein the outer semiconductive layer has a resistivity that limits partial discharge at an outer surface of the outer semiconductive layer at or below 20 nanocoulombs.

9. The heater cable of claim 7, wherein the outer semiconductive layer is configured to allow less than one percent of the alternating current applied to the core conductor to flow through the outer semiconductive layer.

10. The heater cable of claim 6, wherein the outer semiconductive layer reduces partial discharge of the heater cable when the alternating current is applied continuously to the core conductor at a voltage of 10 kV.

11. The heater cable of claim 10, wherein the outer semiconductive layer has a resistivity that limits partial discharge at an outer surface of the outer semiconductive layer to at most 10 nanocoulombs while the voltage is applied to the core conductor.

12. The heater cable of claim 6, wherein the outer semiconductive layer has a resistivity between $10^{-1}$ and $10^{-5}$ ohm-cm inclusive.

13. The heater cable of claim 6, wherein the outer semiconductive layer is affixed to the electrical insulation layer via an extrusion process.

14. The heater cable of claim 6, wherein the outer semiconductive layer comprises a length of semiconductive tape wrapped around the electrical insulation layer.

15. The heater cable of claim 6, further comprising an inner semiconductive layer between the core conductor and the electrical insulation layer.

16. The heater cable of claim 6, wherein the electrical insulation layer comprises a first insulating material and the outer semiconductive layer comprises the first insulating material and a first conductive material.

17. The skin effect heating system of claim 1, wherein the resistivity of the outer semiconductive layer is equal or greater than $10^{-1}$ ohm-cm and less than $10^2$ ohm-cm.

18. The heater cable of claim 6, wherein the outer semiconductive layer has a resistivity between $10^{-1}$ ohm-cm and less than $10^2$ ohm-cm.

* * * * *

UNITED STATES PATENT AND TRADEMARK OFFICE
CERTIFICATE OF CORRECTION

PATENT NO. : 10,959,295 B2
APPLICATION NO. : 15/591949
DATED : March 23, 2021
INVENTOR(S) : Wesley Dong et al.

It is certified that error appears in the above-identified patent and that said Letters Patent is hereby corrected as shown below:

In the Specification

Column 4, Line 41, "$10^6$" should be --$10^0$--.

In the Claims

Column 6, Line 48, Claim 2, "$10^{-5}$" should be --$10^5$--.

Column 8, Line 2, Claim 12, "$10^{-5}$" should be --$10^5$--.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*